FIG. 2 INFRARED ABSORPTION SPECTRUM OF YEMENIMYCIN PELLETED IN KBr

MIGRATION OF YEMENIMYCIN ON PAPER CHROMATOGRAMS WITH DIFFERENT DEVELOPING SOLVENTS

1. PETROLEUM ETHER, b.p 40-60 C
2. PETROLEUM ETHER, b.p 100-120 C
3. DISTILLED WATER
4. BUTANOL - WATER (1:1)
5. METHANOL
6. n- BUTANOL - ACETIC ACID - WATER (1:1:5)
7. ETHYL ACETATE - WATER (1:1)
8. CHLOROFORM SATURATED WITH WATER
9. ETHYL ACETATE - PETROLEUM ETHER
10. ETHANOL
11. CHLOROFORM
12. ETHYL ACETATE
13. ACETONE

3,839,560
YEMENIMYCIN AND PROCESS FOR MAKING SAME

Ibrahim R. Shimi, The University of Ain-Shams, Dept. of Biochemistry, Abbasiah, Cairo, Egypt
Filed Apr. 10, 1972, Ser. No. 242,550
Int. Cl. A61k 21/00
U.S. Cl. 424—122      5 Claims

ABSTRACT OF THE DISCLOSURE

Yemenimycin inhibits growth of various microorganisms such as *Staphylococcus aureus, Micrococcus lysodiekticus, Micrococcus roseus, Bacillus cereus, Streptococcus pyogenes, Candida albicans, Trichophyton mentagrophytes, Trichophyton asteroides, Microsporum audouini, Microsporum canis, Microsporum cookei* and, in addition, inhibits the growth of Yoshida tumor and Sarcoma 180. Yemenimycin is produced by fermentation of a new strain of *Streptomyces albus* designated *Streptomyces albus* (Shimi).

BACKGROUND OF THE INVENTION

This invention is concerned with a new antimicrobial substance and with a process for its production. In particular, this invention relates to a new polypeptide antimicrobial substance designated yemenimycin and to a process for the preparation thereof by fermentation of a *Streptomyces* strain designated *Streptomyces albus* (Shimi). This invention is also concerned with the recovery and purification of the antibiotic substance.

Various antibiotics are known in the art. The need for additional antibiotics is unquestionable in view of the changing ecology of bacterial infections in conjunction wth antibacterial therapy.

SUMMARY OF THE INVENTION

There is provided by the present invention the antimicrobial agent yemenimycin. This substance is produced by cultivating a yemenimycin-producing strain of *Streptomyces albus* on various carbohydrate media containing at least one nitrogenous nutrient. This invention embraces yemenimycin in dilute solution, as crude concentrates, as crude solids, and as purified solids.

DETAILED DESCRIPTION

The new microorganism which produces yemenimycin was discovered in a soil sample of the Northern part of Yemen Lands and is designated *Streptomyces albus* (Shimi); a living culture thereof has been deposited with the Culture Collection Section, Fermentation Division of the Northern Regional Research Laboratory, Bureau of Agriculture and Industrial Chemistry, United States Department of Agriculture at Peoria, Illinois. It has been assigned Catalogue No. NRRL 5415 in the Culture Collection. Ibrahim R. Shimi, et al., *Journal of Antibiotics*, Vol. 24, 283 (May, 1971), the same Ibrahim R. Shimi named as inventor herein, have referred to this organism as *Streptomyces AS-Y-52*.

Figure 1:
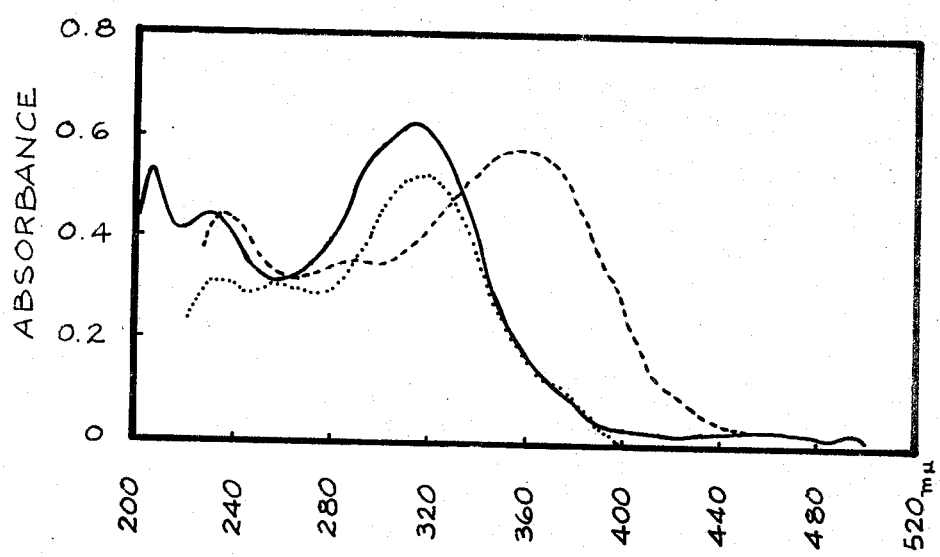
FIG. 1 shows the ultraviolet absorption spectrum of yemenimycin in water, ethanol, acidic and alkaline ethanol.

Yemenimycin is a polypeptide soluble in most organic solvents, and only slightly soluble in water or petroleum ether. In a substantially purified state yemenimycin is formed of pale buff minute needles with a yellowish tinge which when heated gradually darkens at 195° C. and finally melts at 212–214° C. It is freely soluble in chloroform, acetone, ethyl acetate, and butyl acetate, moderately soluble in alcohols such as methyl alcohol, ethyl alcohol and butyl alcohol, and has slight solubility in water and petroleum ether. As shown by FIG. 1, it exhibits ultraviolet absorption maxima in water at 318 m$\mu$, 255 m$\mu$, and 232 m$\mu$ with an absorption intensity of respectively $(E_{1cm.}^{1\%}=523)$ and $(E_{1cm.}^{1\%}=308)$, and $(E_{1cm.}^{1\%}=319)$, in ethanol or acidic ethanol (0.1 N HCl) at 230 m$\mu$ and 314 m$\mu$ with an absorption intensity of respectively $(E_{1cm.}^{1\%}=449)$ and $(E_{1cm.}^{1\%}=626)$, and in alkaline ethanol (0.1 N NaOH), there is a shift of the absorption maxima to 235 m$\mu$ and 356 m$\mu$ with an absorption intensity of respectively $(E_{1cm.}^{1\%}=440)$ and $(E_{1cm.}^{1\%}=558)$.

Figure 2:
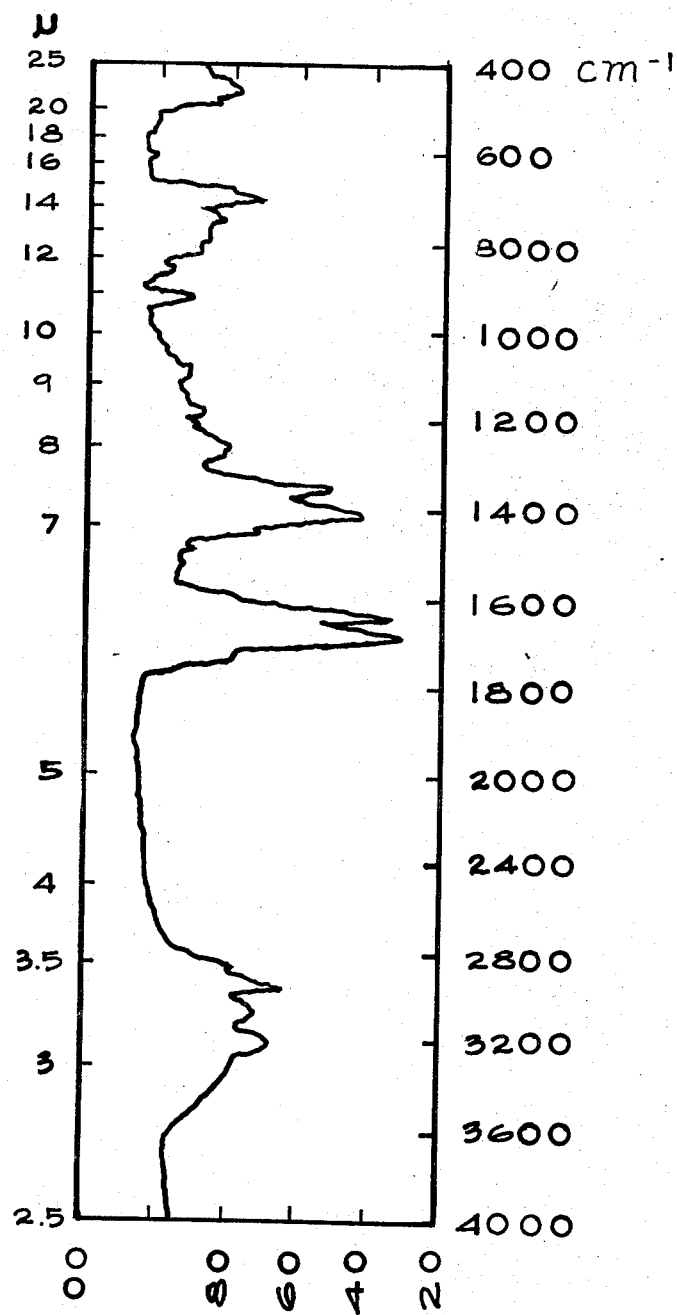
FIG. 2 is the infrared absorption spectrum of yemenimycin in potassium bromide.

As shown in FIG. 2, yemenimycin exhibits characteristic absorption bands in the infrared region when pelleted with potassium bromide at the following wave numbers in cm.$^{-1}$: 3200, 3100, 2980, 2950, 2890, 1690, 1645, 1500, 1460, 1410, 1360, 1280, 1265, 930 and 700. This absorption pattern suggests the presence of the following structural features in yemenimycin: NH, OH, $CH_2$, $CH_3$, $NH_2$, $CONH_2$ and probable aromatic. The optical rotation of yemenimycin at a concentration of 0.005 grams per 100 ml. of methanol is $[\alpha]_D^{20}$ $-268°$. Elemental analysis of yemenimycin is C, 63.7%; H, 5.60%; N, 7.27%; Cl, 4.61%; which corresponds to the empirical formula $C_{41}H_{43}N_4ClO_9$.

The behavior of yemenimycin towards different chemical tests is summarized in Table 1.

TABLE 1
Behavior of Yemenimycin towards different chemical tests

| Chemical tests: | Results |
| --- | --- |
| Alkaline $KMnO_4$ | Reduction on heating. |
| Acidic $KMnO_4$ | Reduction on heating. |
| Molisch's test | Negative. |
| Fehling solution | Negative. |
| Ninhydrin reagent | Negative. |
| Biuret test | Negative. |
| Millon's test | Positive. |
| Sakaguchi's test | Negative. |
| Ferric chloride solution | Negative. |
| Iodine solution | No absorption of iodine. |
| Nitration test | Positive. |
| Potassium thiocyanate | Negative. |
| Potassium ferrocyanide | Negative. |
| Acid hydrolysate + diazotized anthranilic acid | Positive color test. |

Acid hydrolysis of yemenimycin with 6 N HCl at 105° C. for 24 hours liberates at least eight ninhydrin positive substances including the amino acids arginine, aspartic, glutamic, alanine, phenylalanine, and isoleucine.

The hydrolytic products were identified by comparison with the authentic amino acids employing paper chromatographic techniques (one and two-dimensional) and by thin-layer chromatography using different adsorbents.

Figure 3:
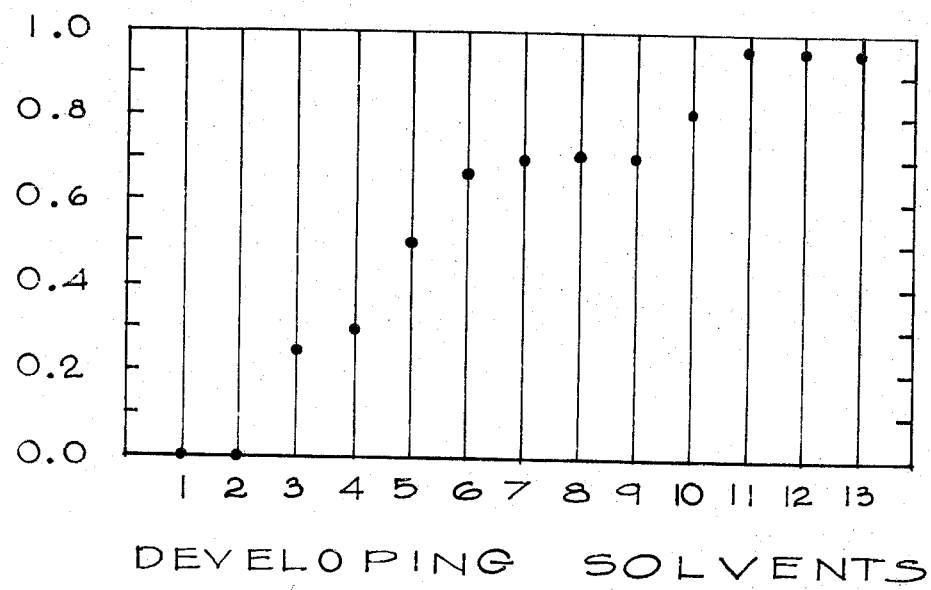
FIG. 3 illustrates the migration of yemenimycin on paper chromatograms with different developing solvents.

The migration of yemenimycin on paper chromatograms when developed by different solvents is shown in FIG. 3. The antibiotic zone is located bioautographically using *Bacillus subtilis* NRRL–B–543 and *Penicillium chrysogenum* Q 176 as test organisms. A single definite inhibition zone was observed. When paper chromatograms were developed with dilute potassium permanganate solution and heated, the only apparent zone was that of the antibiotic.

*Streptomyces albus* (Shimi) was classified according to the system of S. A. Waksman, *The Actinomycetes, Vol. 2*, Chapter 8, Description of Species of Streptomyces, pages 165–292 (Williams and Wilkins, 1961). Among organisms which show a similarity to *Streptomyces albus* (Shims) are *Streptomyces calvus*, *Streptomyces niveus*, and *Streptomyces mirabilis*. The first two organisms differ from *Streptomyces albus* (Shimi) in being able to utilize xylose and arabinose while *Streptomyces albus* (Shimi) cannot. In the case of *Streptomyces niveus*, it is unable to reduce nitrate while *Streptomyces albus* (Shimi) can. *Streptomyces mirabilis* is differentiated from *Streptomyces albus* (Shimi) by secreting a dark brown pigment in a gelatin stab. These differences lead to the conclusion that the microorganism designated *Streptomyces albus* (Shimi) is a new strain of *Streptomyces albus*.

*Streptomyces albus* (Shimi) grown on different media at 28° C. for 14 days showed the following cultural characteristics.

(1) On nutrient agar. Moderate growth with poor aerial mycelium and pale gray substrate mycelium. No soluble pigment.

(2) On glucose-nitrate. Moderate growth with white aerial mycelium and pale brown substrate mycelium. No soluble pigment.

(3) On starch-nitrate. Moderate growth with white aerial mycelium and pale brown substrate mycelium. Pallid brown soluble pigment.

(4) Glucose-asparagine. Poor growth with white substrate mycelium. No aerial mycelium or soluble pigment.

(5) On glycerol-asparagine. Moderate growth with pallid gray aerial mycelium and pale brown substrate mycelium. No soluble pigment.

(6) On milk. Good growth with pallid gray aerial mycelium. Good coagulation and peptonization at pH 7.

(7) Nitrate reduction. Good growth with pallid gray aerial mycelium. No soluble pigment. Reduction after three days.

(8) Stab culture on gelatin. Good growth with pallid gray aerial mycelium and dark brown substrate mycelium. No soluble pigment. Positive liquefaction of gelatin.

(9) Hydrogen sulfide. Poor growth with pale brown substrate mycelium. No aerial mycelium or soluble pigment.

(10) On potato plug. Good growth with white aerial mycelium and brown substrate mycelium. Brown soluble pigment.

(11) On cellulose. No growth.

(12) Melanin Formation. Negative.

(13) Utilization of carbon sources in a liquid medium consisting of the composition (g./100 ml.): carbon source (1.0), $(NH_4)_2SO_4$(0.264), $KH_2PO_4$(0.238), $K_2HPO_4$(0.565), $Mg.SO_4.7H_2O$(0.00015) incubated at 28° C. Strong growth with D-glucose and starch. Moderate growth with D-maltose, inulin, D-lactose, and D-sorbitol. Feeble growth in D-fructose, D-galactose, D-raffinose, D-mannitol, sucrose, and glycerol. No growth in L-arabinose or D-xylose.

*Streptomyces albus* (Shimi) is characterized by its white to light gray aerial mycelium and by its negative melanin test. On natural mediums, a faint brownish pigment is occasionally produced. Microscopic examination of cultures grown on starch-nitrate medium reveals straight to wavy sporophores. Under an electron-microscope, the sporophores exhibited oval spores with smooth surfaces.

It is to be understood that the present invention embraces the use not only of the microorganism *Streptomyces albus* (Shimi) of the above description, which is given merely for illustrative purposes, but it also embraces use of mutants produced from the described organism by means such as X-ray radiation, ultraviolet radiation, treatment with nitrogen mustards, or other chemical or physical mutagenic agents, through genetic crossing and the like. It is further to be understood that the invention includes the use of subcultures taken by various standard microbiological techniques such as single colony isolation methods. Such mutants or subcultures may differ in certain respects from the above described culture. By definition, *Streptomyces albus* (Shimi) of the present invention includes all strains thereof which produce yemenimycin.

The process of the present invention for the production of the antimicrobial agent yemenimycin comprises cultivating by fermentation a strain of *Streptomyces albus* (Shimi) in an aqueous medium containing carbon sources and nitrogen sources under aerobic conditions until a substantial amount of yemenimycin is accumulated in said solution. In carrying out the process, the fermentation broth containing yemenimycin is prepared by inoculating a suitable medium with the yemenimycin producing microorganism and then cultivating under aerobic conditions. Any fermentation temperature can be employed within the range in which the yemenimycin-producing organism can grow with a preferred temperature of about 28° C. Media consisting of known kinds of nutritional sources for actinomycetes are useful for the production of yemenimycin. For example, for the production of yemenimycin, commercially available products such as glycerol, glucose, starch, dextrin, maltose, lactose, sucrose, molasses, oil, fats, lipids and the like are useful as the carbon sources in either purified or crude state. Commercially available products such as soybean meal, meat extract, peptone, yeast extract, distiller's solubles, peanut powder, cotton seed powder, fish powder, corn steep liquor, casein, nitrates, ammonium salt, urea and the like are useful as the nitrogen source. Inorganic salts such as sodium nitrate, sodium chloride, potassium chloride, potassium phosphate, magnesium sulfate, and the like, and a small amount of heavy metal salts such as ferric sulfate are added if desired. Small amounts of salts of other heavy metals such as copper, manganese, zinc and the like, can also be employed if desired. As a general rule, any materials useful for the growth of *Streptomyces* can be used. Antifoam agents such as silicone oil, soybean oil, fat or other agents which are useful in the processes for the production of penicillin or streptomycin can also be employed.

In the treatment of bacterial infections and fungal infections in mammals, the compounds of the present invention are administered topically, orally, and parenterally in accordance with conventional procedures for antibiotic and antifungal administration. Yemenimycin is administered in a dosage unit containing a non-toxic effective amount of yemenimycin with suitable physiologically acceptable carriers or excipients. The dosage units can be in the form of liquid preparations such as solutions, dispersions, emulsions or in solid forms such as tablets, capsules, etc.

In mice the $ALD_{50}$ of yemenimycin administered intraperitoneally is 3.5 mg./kg. body weight after three days and the $ALD_{50}$ at seven days is 1.1 mg./kg. body weight. No toxic symptoms were observed when daily applications of 0.00001% of aqueous alcoholic solution of yemenimycin were topically administered to superficial wounds of Swiss mice for fourteen consecutive days. Subsequent to stopping the application of yemenimycin, the mice showed no toxic symptoms after several months.

The following examples are merely illustrative, and it should be understood that the invention is not limited thereto.

EXAMPLE I

Cultivation of Streptomyces AS–Y–52

A fermentation medium having the following composition is prepared and inoculated with *Streptomyces albus* (Shimi).

| Component: | Grams, per liter |
| --- | --- |
| Soluble starch | 20 |
| Sodium nitrate | 2.0 |
| Potassium phosphate, dibasic | 1.0 |
| Magnesium sulfate heptahydrate | 0.5 |
| Potassium chloride | 0.5 |
| Ferrous sulfate pentahydrate | 0.005 |

Incubation is carried out in the shaken culture at 200 cycles per minute for about six days. After incubation, the broth is freed from mycelia and then extracted repeatedly with a 1:1 mixture of chloroform-ethyl acetate at a pH of 7.0 to about 7.5. The extract of the broth is repeatedly washed with carbonate-bicarbonate buffer at pH 10.0 in order to remove pigments and other inactive impurities and the organic solvent layer then freed from traces of buffer by shaking with distilled water. Evaporation of the organic extract to dryness under reduced pressure yields a dark brownish residue of crude yemenimycin. The crude yemenimycin is extracted several times with dry methanol leaving an inactive dark brown precipitate. Further purification is carried out by passing the combined methanol extracts through a short column of activated charcoal which adsorbs residual pigments and a small portion of yemenimycin. Slow evaporation of the methanolic solution provides pale yellowish buff minute needles of substantially pure yemenimycin. Additional yemenimycin is obtained from the mycelial cake by removing excess liquid, suspending the cake in acetone and shaking the suspension for six hours. The acetone extract, which shows considerable activity, is evaporated to dryness in vacuum and the residue thus obtained extracted with dry methanol and purified further as described above.

An alternate and preferred method of purifying crude yemenimycin is as follows. The methanol extracts of crude yemenimycin are evaporated to dryness under vacuum and resulting residue dissolved in a minimal volume of chloroform to which ten volumes of dry benzene are added. Insoluble material is separated from the chloroform-benzene solution and washed repeatedly with dry benzene. The combined chloroform-benzene solution is shaken with carbonate buffer at pH 10. Evaporation of the organic phase under vacuum provides yemenimycin containing material which is chromatographed on silica gel using n-butanol-acetic acid-water (3:1:1) or preferably a 3:1 mixture of petroleum ether (b.p. 40–60° C.)-chloroform thereby providing substantially purified yemenimycin.

EXAMPLE II

Activities of Yemenimycin

*Antibacterial activity.*—Using the conventional serial tube dilution method, the minimum inhibitory concentration against a number of test organisms was determined.

Yemenimycin is effective against Gram-positive bacteria and exhibits high potency. Against representatives of Gram-negative bacteria, it is only weakly active. The minimal inhibitory concentrations against the test organisms evaluated ranged from 0.006 to 0.78 mcg./ml. Gram-positive bacteria particularly sensitive to yemenimycin are *Bacillus cereus, Micrococcus lysodiekticus, Micrococcus roseus, Staphylococcus aureus,* and *Streptococcus pyogenes.* In the Gram-negative group feeble activity was demonstrated against *Proteus, Salmonella,* and *Shigella* species. Results for representative test bacteria are summarized in Table 2.

TABLE 2

In vitro antibacterial activity of yemenimycin

| Test bacteria: | Minimal inhibitory concentration mcg./ml. |
| --- | --- |
| *Bacillus cereus* var. *mycoides* | <0.006 |
| *Bacillus subtilis* ATCC 9524 | 0.78 |
| *Corynebacterium minitissimum* UP 59 | 0.19 |
| *Micrococcus lysodiekticus* | <0.006 |
| *Micrococcus roseus* | <0.006 |
| *Sarcina lutea* ATCC 9341 | 0.19 |
| *Staphylococcus aureus* 209P | <0.006 |
| *Staphylococcus aureus* 4213 | <0.006 |
| *Staphylococcus aureus* Rose | 0.012 |
| *Staphylococcus aureus* Smith | <0.006 |
| *Staphylococcus aureus* Speier | <0.006 |
| *Streptococcus pyogenes* | <0.006 |
| *Citrobacter freundii* 532–57 | >100 |
| *Enterobacter aerogenes* 659–66 | 50 |
| *Enterobacter cloacae* 5680 | >50 |
| *Escherichia coli* MJ 51 | 12.5 |
| *Escherichia coli* MJ 50 | >100 |
| *Escherichia coli* N27405 | 25 |
| *Klebsiella ozaenae* CDC | >100 |
| *Klebsiella pneumoniae* | 100 |
| *Klebsiella pneumoniae* CDC | >100 |
| *Proteus mirabilis* SU12 | 6.25 |
| *Proteus morganii* 1166 | 6.25 |
| *Proteus rettgeri* SU19 | >100 |
| *Proteus vulgaris* Pr–1 CDC | 12.5 |
| *Pseudomonas aeruginosa* ATCC 9027 | >100 |
| *Pseudomonas aeruginosa* ATCC 14502 | >100 |
| *Pseudomonas aeruginosa* UI 10 | >100 |
| *Pseudomonas aeruginosa* SUI 14 | >100 |
| *Salmonella cholerasuis* | 25 |
| *Salmonella derby* | >100 |
| *Salmonella enteritidis* | 100 |
| *Salmonella indiana* (White) | 100 |
| *Salmonella pullorum* | 12.5 |
| *Salmonella typhimurium* | 50 |
| *Serratia marcescens* 252–67 | >100 |
| *Serratia marcesens* | >100 |
| *Shigella boydii* 2, 2854–61 | 12.5 |
| *Shigella flexneri* 2b,1794–65 | 25 |
| *Shigella sonnei* SUI 21 | 25 |

*Antifungal activity.*—Yemenimycin is notably strong against fungi. Different strains of *Candida albicans, Trichophyton mentagrophytes* and *Microsporum audouini* are exceptionally sensitive to yemenimycin. Minimal inhibitory concentrations range from less than 0.012 to 1.56 mcg./ml. Results for representative test fungi are summarized in Table 3.

TABLE 3

In vitro antifungal activity of yemenimycin

| Test fungi: | Minimal inhibitory concentration mcg./ml. |
|---|---|
| Microsporum audouini ATCC 9079 | <0.012 |
| Microsporum canis ATCC 10241 | 0.024 |
| Microsporum cookei SUI 1127 | 0.39 |
| Keratinomyces ajelloi SUI 1123 | 1.56 |
| Trichophyton mentagrophytes (gypseum) ATCC 9129 | <0.012 |
| Trichophyton mentagrophytes (interdigitale) ATCC 9972 | <0.012 |
| Trichophyton mentagrophytes (asteroides) ATCC 8757 | <0.012 |
| Trichophyton asteroides (Japan) | <0.012 |
| Trichophyton rubrum | 0.095 |
| Candida albicans ATCC 10231 | 0.095 |
| Candida albicans NRRL 400 | <0.012 |
| Candida albicans NRRL 477 | <0.012 |
| Alternaria solani | 0.78 |
| Rhizoctonia solani | 0.78 |
| Penicillium chrysogenum NRRL Q 176 | 1.56 |
| Fusarium oxysporum | 0.78 |
| Fusarium lycopersici | 0.39 |
| Botrytis allii | 1.56 |

*Antitumor activity.*—When mice are inoculated with Yoshida tumor and Sarcoma 180, intraperitoneal injection of yemenimycin 48 hours after transplatation in a dose of 1 mg./kg. body weight provides more than 50% inhibition of the tumor with a survival time of greater than three weeks. Similar results are obtained when yemenimycin is injected at a daily dose of 0.5 mg./kg. body weight for two to three successive days. Injection of yemenimycin at the site of transplantation gives better curative results.

While several particular embodiments of this invention are shown above, it will be understood that the invention is not to be limited thereto as many modifications may be made, and it is contemplated, therefore, by the appended claims to cover any such modifications that fall within the true spirit and scope of this invention.

What is claimed is:
1. The substance yemenimycin which:
   (a) is effective in inhibiting the growth of *Staphylococcus aureus, Micrococcus lysodiekticus, Micrococcus roseus, Bacillus cereus, Streptococcus pyogenes, Candida albicans, Trichophyton mentagrophytes, Trichophyton asteroides, Microsporum audouini, Microsporum canis, Microsporum cookei,* Yoshida tumor and Sarcoma 180 in the mouse;
   (b) is soluble in chloroform, acetone, ethyl acetate, butyl acetate, methyl alcohol, ethyl alcohol, and butyl alcohol but substantially insoluble in water and petroleum ether; the pure crystalline form of which:
   (c) decolorizes potassium permanganate, gives positive Millon and nitration reactions and negative Molisch, Fehling, ninhydrin, biuret, Sakaguchi, ferric chloride, iodine, potassium thiocyanate, and potassium ferrocyanide reactions;
   (d) gives by hydrolysis the amino acids arginine, aspartic acid, glutamic acid, alanine, phenylalanine, and isoleucine;
   (e) exhibits ultraviolet absorption maxima at 318 mµ, 255 mµ, and 232 mµ in water, 230 mµ and 314 mµ in ethanol or acidic ethanol, 235 mµ and 356 mµ in alkaline ethanol solution as shown in FIG. 1;
   (f) exhibits characteristic bands in the infrared absorption spectrum at 3200, 3100, 2980, 2950, 2890, 1690, 1645, 1500, 1460, 1410, 1360, 1280, 1265, 930 and 700 cm.$^{-1}$ as shown in FIG. 2;
   (g) has an optical rotation of $[\alpha]_D^{20}$ —268° in methanol;
   (h) has the following elemental analysis: C, 63.7%; H, 5.60%; N, 7.27%; Cl, 4.61%; and
   (i) darkens at 194° C. and melts at 212–214° C. when heated in a capillary tube.

2. The process for the production of the substance yemenimycin as defined in Claim 1 by a fermentation process which comprises cultivating *Streptomyces albus* (Shimi) NRLL 5415 on an aqueous carbohydrate solution containing a nitrogenous nutrient under submerged aerobic conditions until substantial antimicrobial activity is imparted to said solution.

3. The process of Claim 2 wherein cultivation is carried out at 28° C.

4. The process for the production of the substance yemenimycin as defined in Claim 1 by a fermentation process which comprises cultivating *Streptomyces albus* (Shimi) NRRL 5415 on an aqueous carbohydrate solution containing a nitrogenous nutrient under submerged aerobic conditions until substantial antimicrobial activity is imparted to said solution and isolating said yemenimycin therefrom by extracting crude yemenimycin with methanol, passing the methanol extract through a column of activated charcoal, and evaporating the methanol eluate.

5. The process for the production of the substance yemenimycin as defined in Claim 1 by a fermentation process which comprises cultivating *Streptomyces albus* (Shimi) NRRL 5415 on an aqueous carbohydrate solution containing a nitrogenous nutrient under submerged aerobic conditions until substantial antimicrobial activity is imparted to said solution and isolating said yemenimycin therefrom by chromatographing yemenimycin containing material on silica gel using petroleum ether-chloroform for elution.

References Cited

Shimi et al., J. Antibiotics, vol. 24, No. 5, May 1971, pp. 283–289.

JEROME D. GOLDBERG, Primary Examiner

U.S. Cl. X.R.

195—80 R